United States Patent [19]

Meurer

[11] 4,401,576
[45] Aug. 30, 1983

[54] SEDIMENT COLLECTING DEVICE

[75] Inventor: C. Lonnie Meurer, Englewood, Colo.

[73] Assignee: Meurer Industries, Inc., Englewood, Colo.

[21] Appl. No.: 220,843

[22] Filed: Dec. 29, 1980

[51] Int. Cl.³ .................. B01D 21/06; B01D 21/20
[52] U.S. Cl. ......................... 210/803; 210/416.2; 210/525
[58] Field of Search ............ 210/525, 527, 143, 803, 210/528, 416.2; 15/1.7; 92/65

[56] References Cited

U.S. PATENT DOCUMENTS

| | | | |
|---|---|---|---|
| 1,918,742 | 7/1933 | Elrod | 210/525 |
| 3,616,651 | 9/1969 | Chang et al. | 405/158 |
| 3,707,737 | 1/1973 | Brower | 15/1.7 |
| 4,002,105 | 1/1977 | Bell | 92/65 |
| 4,090,966 | 5/1978 | Clendenen | 210/143 |
| 4,193,871 | 3/1980 | White et al. | 210/525 |

FOREIGN PATENT DOCUMENTS 1199886 7/1970 United Kingdom .................. 15/1.7

*Primary Examiner*—Charles N. Hart
*Assistant Examiner*—Wanda L. Millard
*Attorney, Agent, or Firm*—Fields, Lewis, Pittenger & Rost

[57] ABSTRACT

A sediment collecting device is provided which includes a collection body positioned adjacent the floor of a liquid-containing vessel. The collection body moves across the vessel floor along a fixed track in a stepping manner. A suction pipe or, alternatively, a scraping mechanism is integrally joined to the collection body for collecting sediment as the collection body is driven. The collection body is capable of reciprocating movement along the track and includes first, second and third body members. When the collection body is driven by means of pressurized fluid applied in a predetermined manner to cylinders fastened to the second body member, at least one body member is moved relative to at least another one of the remaining two body members.

17 Claims, 13 Drawing Figures

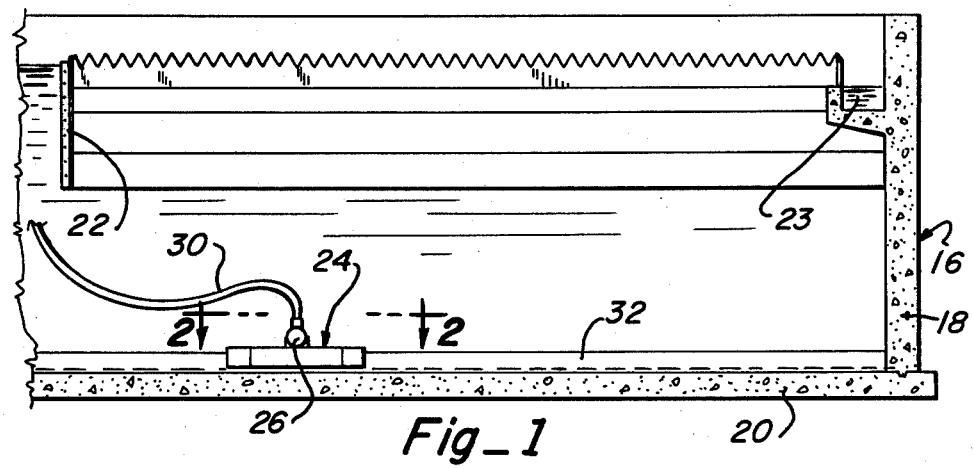
Fig_1
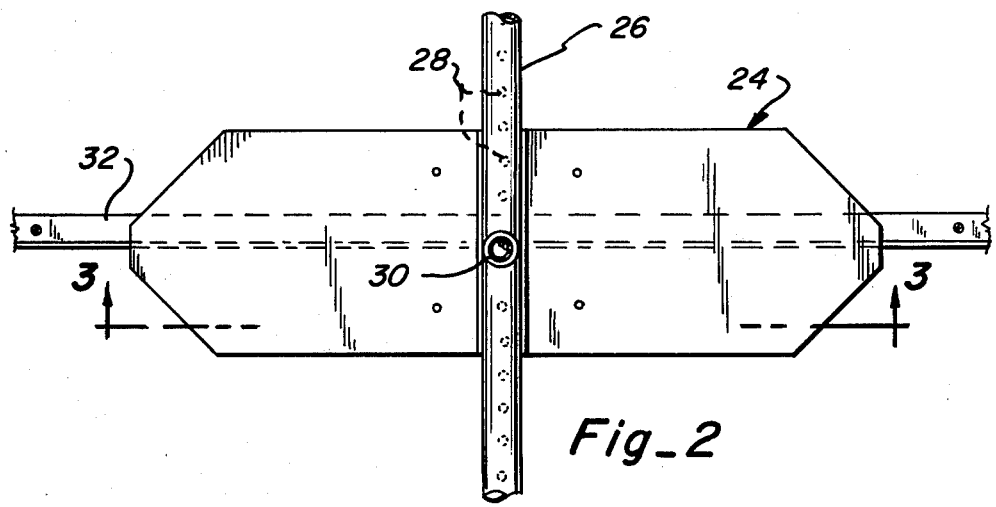
Fig_2
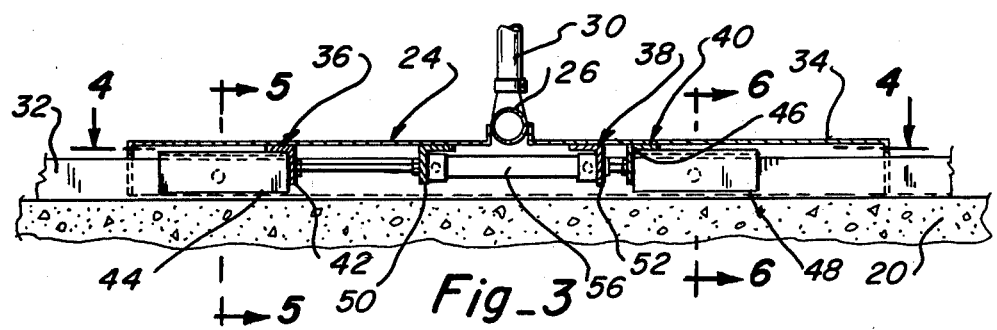
Fig_3

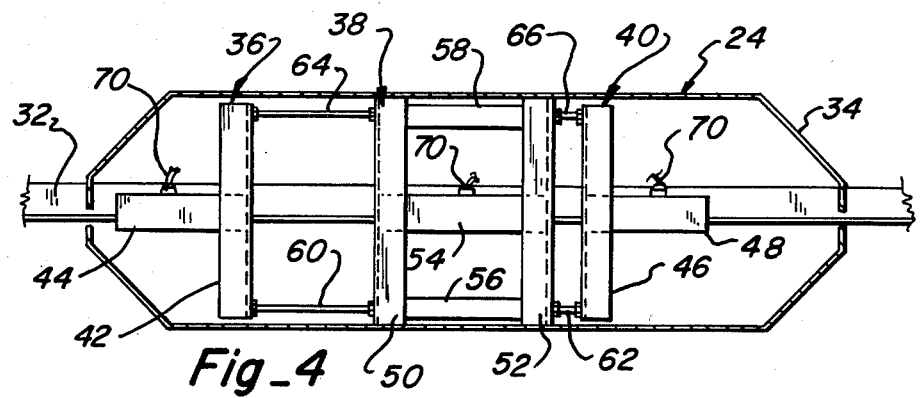
Fig_4
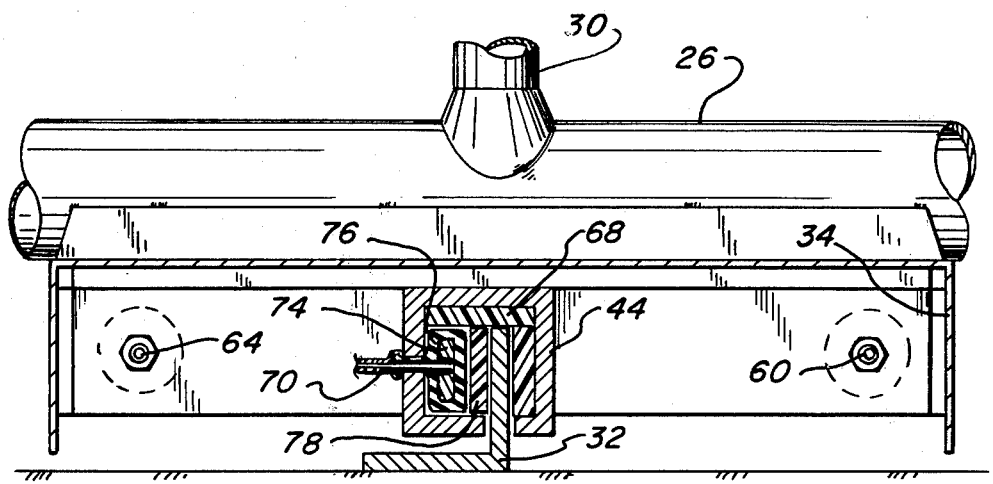
Fig_5
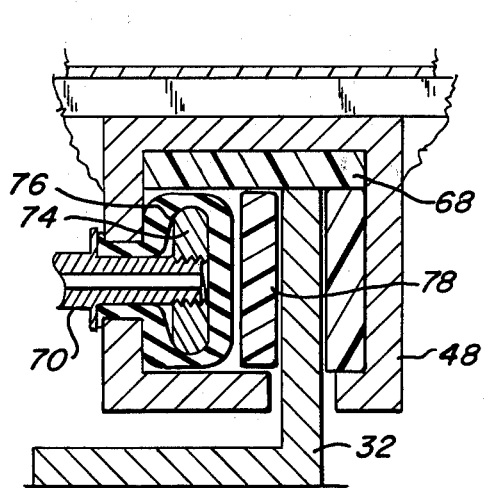
Fig_7
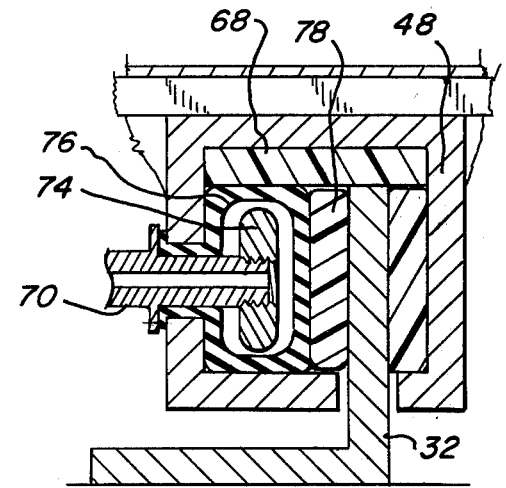
Fig_6

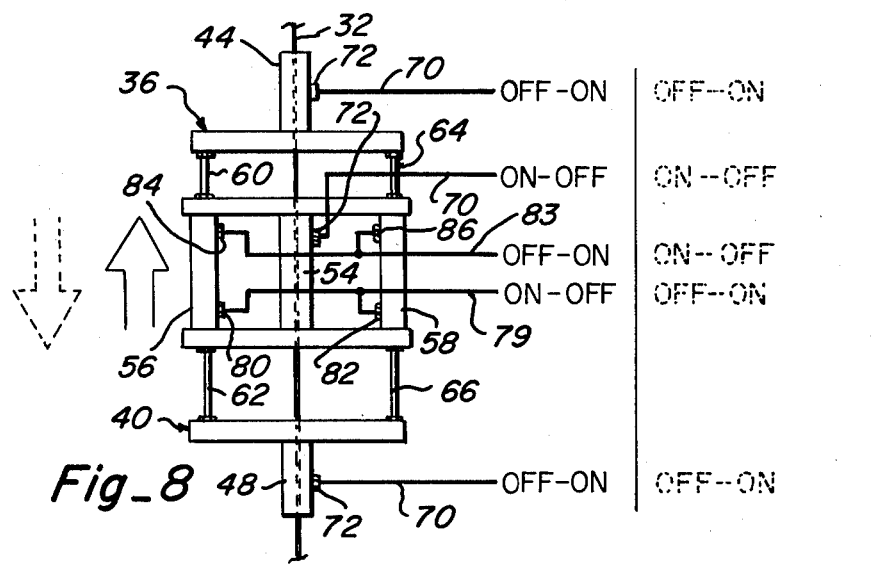
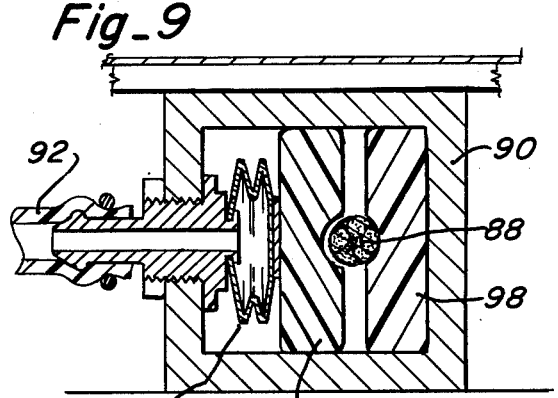
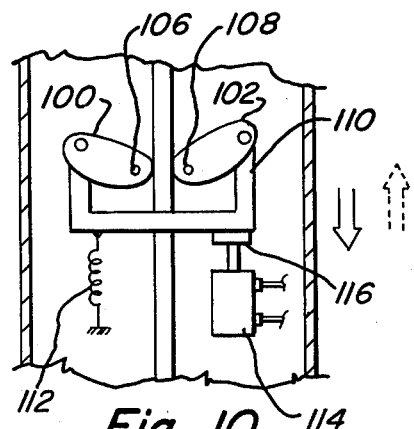
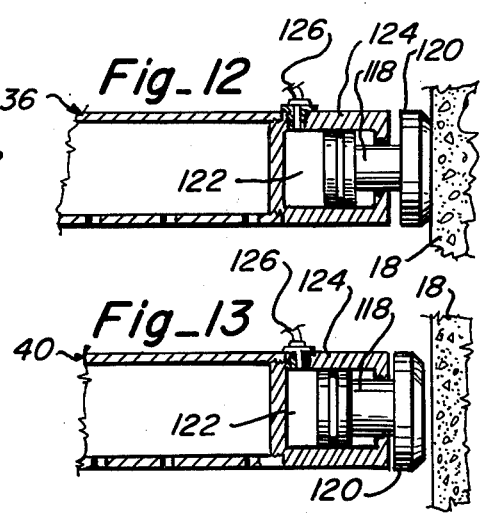

SEDIMENT COLLECTING DEVICE

FIELD OF THE INVENTION

This invention relates to devices for removing sediment contained in a vessel and, in particular, to drive mechanisms for use in moving suction devices or scraping devices across the floor of a basin to collect sediment.

BACKGROUND ART

Different devices have been provided to remove sediment which passes to the bottom of a liquid-containing vessel. Typically, these devices include a drive mechanism, at least portions of which are positioned exteriorly of the liquid contained in the vessel. The primary purpose for avoiding contact by the drive mechanism with the liquid is because the drive mechanism includes an electric motor and current conducting wires. It is a highly advisable safety feature to minimize the possibility of the liquid acting as a current conductor. For example, in U.S. Pat. No. 4,090,966 to Clendenen, a sediment collecting system is shown which includes an electric motor for use in driving wire cable about pulleys. The motor is positioned outwardly of the liquid contained in a basin. In addition, as again exemplified by the patent to Clendenen, previously known drive mechanisms include various gear and pulley arrangements. The drive mechanism of the present invention, on the other hand, is devoid of electric motors, current conducting wires, gears and pulleys. The drive mechanism herein described is placed within the liquid and supported by the floor of a vessel and is used to move a suction pipe or scraper in a step fashion to remove sediment.

SUMMARY OF THE INVENTION

The present invention is a device for removing sediment from the floor of a vessel and includes a mechanism utilizing pressurized fluid for moving the device within the vessel. The device includes a collection body which moves along a track fixedly positioned on the floor of the vessel. The collection body is directly connected to or formed integrally with a suction pipe or scraper and the collection body is supported by the floor of the vessel. The collection body is surrounded by a liquid, such as water. The collection body includes a first body member, a second body member, and a third body member. A first cylinder is joined to one side of the second body member while a second cylinder is joined to a second and opposite side of the second body member. Rods connected to the cylinders join the first and third body members to the second body member. In order to move the collection body and suction pipe or scraper along the track, a pressurized fluid is provided to each cylinder in a predetermined manner to move at least one of the body members relative to at least another one of the body members. As the collection body moves, the suction pipe or scraper gathers the sediment for removal from the vessel.

In particular, the present invention includes a collection body positioned adjacent the floor of a vessel. The collection body includes first, second and third body members. Each of the body members includes a slide member which is movable along a track. In one embodiment, each slide member includes an opening for receiving a pressure line. Housed within each slide member and having an aperture to receive the end of the pressure line is a clamping member. Attached to the second body member at opposite sides thereof are first and second cylinders. Each of these two cylinders has a pair of openings located at opposite ends of each cylinder. Each of the openings receives a pressure line which carries pressurized fluid to the cylinder ends. Each cylinder has two rods fixed thereto for movement coaxially of the cylinder. A rod is located at each of the opposing ends of each cylinder and movement of the two rods in one cylinder is in the same direction. For each cylinder, an end of one of the two rods is fastened to the first body member while an end of the other rod is fastened to the third body member. The remaining two ends of the two rods are connected to a piston housed within the cylinder.

In moving the device in a first direction along the track in a stepping manner, the clamping member located in the slide member of the second body member is activated or engaged. When the clamping member is activated, the second body member grips the track to prevent movement of the second body member. Subsequently, pressurized fluid is provided to the first and second cylinder openings at first ends of the cylinders. The pressurized fluid against the pistons in the cylinders moves the rods fastened to the first body member so that the first body member is extended or slid along the track. Next, the clamping member is deactivated on the grip on the track released while the clamping members located in the first body member and third body member are activated. Then, pressurized fluid is provided to the first and second cylinder openings located at second ends of the cylinders to enable the second body member to move or slide along the track relative to the first body member and the third body member. In this manner, the collection body is driven along the track in a first direction. In order to move in a second direction, opposite the first direction just described, a similar procedure utilizing pressurized fluid is provided.

Based on the foregoing, it is readily seen that the present invention offers many salient features. A sediment collecting device is provided which is positioned adjacent the floor of a liquid-containing vessel to remove the sediment deposited therein. The device is moved in a stepping manner by means of pressurized fluid. No chains or cables are required to drive the collection body. No electric motors or conducting wires need be located within the vessel. Unlike a typical pulley arrangement, there is no rotory motion produced to move the device. Further, the device moves in a reciprocating manner, that is to say, back and forth across the vessel floor. The collection body of the present invention is integrally joined to a suction pipe for drawing sediment into collecting holes formed in the pipe or a scraping mechanism for gathering the sediment as the collection body moves.

BRIEF DESCRIPTION OF THE DRAWINGS

FIG. 1 is a sectional view through a vessel containing sediment showing the present invention positioned on the floor of the vessel;

FIG. 2 is an enlarged, fragmentary, top plan view, taken along line 2—2 of FIG. 1, showing the present invention which has a suction pipe;

FIG. 3 is a longitudinal section, taken along line 3—3 of FIG. 2, through the body members of the collection body;

FIG. 4 is a top plan section, taken along line 4—4 of FIG. 3, showing further details of the three body members;

FIG. 5 is an enlarged, fragmentary, lateral section, taken along line 5—5 of FIG. 3, illustrating a clamping member housed within a slide member;

FIG. 6 is a greatly enlarged, fragmentary, lateral section, taken along line 6—6 of FIG. 3, illustrating operation of a clamping member for gripping the track and preventing movement of the third body member;

FIG. 7 is a lateral section similar to FIG. 6 showing the clamping member deactivated to permit movement of the third body member;

FIG. 8 is a top plan diagrammatic view of the three body members illustrating movement thereof depending upon the application of pressurized fluids;

FIG. 9 is a lateral section showing another embodiment for clamping a body member by gripping a cable along which the body member moves;

FIG. 10 is a top plan section of another embodiment for clamping a body member to a track;

FIG. 11 is a top plan section illustrating still another embodiment wherein the clamping member includes plungers for gripping the vessel walls to prevent movement of the device;

FIG. 12 is a greatly enlarged, fragmentary, longitudinal section, taken along line 12—12 of FIG. 11, illustrating a plunger gripping a vessel wall; and FIG. 13 is a greatly enlarged, fragmentary, longitudinal section, taken along line 13—13 of FIG. 11, illustrating a plunger released from a vessel wall.

DESCRIPTION OF THE PREFERRED EMBODIMENTS

In accordance with the present invention, a sediment collecting device is provided for use in a liquid-containing vessel 16. As depicted in FIG. 1, the vessel 16 includes side wall 18 and floor 20. Fastened to the vessel side wall 18 is a weir 22 for controlling the liquid in the vessel 16. After the level of the liquid in the vessel 16 rises above the weir 22, it is directed to a channel 23 from which the liquid is removed from the vessel 16. Prior to the liquid being received in the channel 23, any sediment mixed with the liquid falls to the vessel floor 20.

The sediment collecting device includes a collection body 24 and a suction pipe 26. Suction pipe 26 is mounted on the top surface of the collection body 24 and extends perpendicularly to the longitudinal extent of the collection body 24 for a distance essentially corresponding to the width of the vessel 16. As shown in FIG. 2, a plurality of holes 28 spaced from each other are formed in the suction pipe 26 throughout its extent.

A vacuum line 30 from an appropriate source of power is attached to the suction pipe 26 at about its midportion. The vacuum line 30 is used in creating a vacuum for drawing sediment located adjacent the vessel floor 20 into the holes 28 so that the sediment is carried from the vessel 16 through the vacuum line 30.

The sediment collecting device is positioned on a track 32 to move or slide therealong. The track 32 is supported on the vessel floor 20. The track 32 is generally perpendicular relative to the suction pipe 26.

Although the embodiment depicted in the drawings illustrates a suction pipe 26 connected to the collection body 24, it is understood that other sediment collecting mechanisms can be provided. For example, a scraping mechanism can be attached to the collection body 24 rather than a suction pipe 26. Additionally, it is readily appreciated that the present invention can be used in all sizes and shapes of vessels including, but not limited to, circular shaped vessels as well as rectangular shaped vessels.

As shown in FIGS. 3 and 4, the collection body 24 further includes a housing 34, first body member 36, second body member 38, and third body member 40. The housing 34 surrounds and contains the three body members 36, 38, 40. The first body member 36 includes a cross member 42 and a slide member 44 integrally joined to the cross member of 42, as seen in FIG. 4. Similarly, the third body member 40 includes a cross member 46 and a slide member 48 integrally joined to the cross member 46. Positioned between first and third body members 36, 40 is the second body member 38 comprising frame members 50, 52 and slide member 54. The slide member 54 interconnects the two frame members 50, 52. The slide members 44, 48 are connected to the midportions of the cross members 42, 46 while the slide member 54 is connected to the midportions of frame members 50, 52.

First body member 36 is joined to second body member 38 by an interconnecting mechanism including a pair of cylinders 56, 58. First cylinder 56 extends between frame members 50, 52 and is attached thereto at opposite ends of first cylinder 56. First cylinder 56 has a pair of piston rods 60, 62. Each piston rod 60, 62 is retractable within the first cylinder 56 as well as extendable out of an end of first cylinder 56. The outer end of piston rod 60 is fastened to cross member 42 of first body member 36 adjacent a first side of the cross member 42. The outer end of the piston rod 62 is fastened to cross member 46 of second body member 38 adjacent a first side of cross member 46. The inner ends of the piston rods 60, 62 are connected to a common piston (not shown) contained within first cylinder 56.

Likewise, second chylinder 58 extends between frame members 50, 52 and is attached to the sides of the frame members 50, 52 opposite those sides to which first cylinder 56 is connected. The second cylinder 58 has a pair of piston rods 64, 66. Each piston rod 64, 66 is retractable within the second cylinder 58 as well as extendable out an end thereof. The outer end of the piston rod 64 is fastened to cross member 42 of first body member 36 adjacent a second side of the cross member 42. The outer end of the piston rod 66 is fastened to cross member 46 adjacent a second side of the cross member 46. The inner ends of the piston rods 64, 66 are connected to a common piston (not shown) contained within second cylinder 58.

Fixably fitted within the hollow interior of each of the slide members 44, 48, 54, is a contact member 68 which the track 32 engages as the collecting device moves along the track 32. The contact member 68 contained within slide member 44 is depicted in FIG. 5 while the contact member 68 of third body member 40 is shown in FIGS. 6 and 7. The contact member 68 is typically made of a strong plastic and is held against two of the inner walls of a slide member. Securely connected to each slide member 44, 48, 54 is also a pressure brake line 70 which is received in a brake opening 72 formed in each slide member 44, 48, 54, as represented in FIG. 8. The pressure brake line 70 carries pressurized fluid to its corresponding brake opening 72 as will be subsequently discussed. Each pressure brake line 70 is of sufficient length so that the sediment collecting device is movable along the entire extent of the track 32 contained in the vessel 16.

In addition, a track clamping mechanism is positioned within each slide member 44, 48, 54. Each clamping mechanism includes a rigid, generally rectangular bar 74 surrounded by a diaphragm 76. The bar 74 has a threaded opening. Correspondingly, the diaphragm 76 has an opening aligned or coaxial with the bar opening. A threaded end of the pressure brake line 70 is tightly held in the threaded bar opening to connect the pressure brake line 70 to the clamping mechanism.

The clamping mechanism further includes a brake pad 78 held adjacent the diaphragm 76 within each slide member 44, 48, 54 for engagement with the diaphragm 76. The pressure brake line carries pressurized fluid so that the fluid can exit into the diaphragm 76. As illustrated in FIG. 6, pressurized fluid is contained in the diaphragm 76. As a result, the diaphragm 76 expands and pushes against the brake pad 78. In turn, the brake pad 78 engages the track 32 so that the slide member 48 is thereby clamped or braked on the track 32, for purposes to be discussed later. FIG. 7 illustrates the workings of the clamping mechanism when the pressurized fluid is no longer present in the diaphragm 76. As can be seen, the track 32 is no longer clamped between the brake pad 78 and the contact member 68. Consequently, the slide member 48 is free to move along the track 32 when the collecting device is driven.

The operation of the sediment collecting device is illustrated diagrammatically in FIG. 8. As stated previously, the device is capable of a reciprocating, stepping movement. A description of the stepping movement in a first direction (illustrated by the solid line arrow of FIG. 8) is given first. For explanation purposes, it is assumed that the first body member 36 is immediately adjacent second body member 38 so that the piston rods 60, 64 are retracted within first cylinder 56 and second cylinder 58, respectively. In order to move first body member 36 away from second body member 38 or in the direction illustrated by the solid line arrow, no pressurized fluid is provided to the clamping mechanisms of slide members 44, 48. The clamping mechanism of slide member 54 is then activated by providing pressurized fluid through pressure brake line 70 and brake opening 72 to the diaphragm 76 housed therein. As a result, the second body member 38 is held fixed or braked upon the track 32. Next, pressurized fluid is provided to both first and second cylinders 56, 58 through pressure drive line 79 and drive openings 80, 82. Pressure drive line 79 carries pressurized fluid to the cylinders 56, 58 for use in driving the device. Drive openings 80, 82 are formed in the cylinders 56, 58 at first ends thereof adjacent frame member 52 of second body member 38. The pressurized fluid against the pistons within the cylinders 56, 58 forces the piston rods 60, 64 outwardly of the cylinders 56, 58 while the second body member is held fixed to thereby move or slide first body member 36 along the track 32 relative to and away from the second body member 38. Since piston rods 62, 66 are connected to the common piston to which piston rods 60, 64 are also connected, third body member 40 moves in a direction towards second body member 38.

After the piston rods 60, 64 have reached their fullest outer extent with respect to the second body member 38 or where third body member 40 is immediately adjacent second body member 38, the clamping mechanisms of slide members 44, 48 are activated by means of the application of pressurized fluid thereto through their respective pressure brake lines 70 and brake openings 72. The clamping mechanism of slide member 54 is released. Next, pressurized fluid is provided to both cylinders 56, 58 through drive line 83 and drive openings 84, 86. Pressure drive line 83 carries pressurized fluid to the cylinders 56, 58 for use in driving the device. Drive openings 84, 86 are formed in the cylinders 56, 58 at second ends thereof adjacent frame member 50 of second body member 38. The pressurized fluid against the pistons in the cylinders 56, 58 through these drive openings 84, 86 while first body member 36 and third body member 40 are clamped to the track 36, results in a force which pulls second body member 38 in the direction of the first body member 36 to retract piston rods 60, 64 within their respective cylinders 58, 58 while moving second body member 38 along the track 32 relative to and towards first body member 36. Second body member 38 moves until it contacts first body member 36. The piston rods 62, 66 connected to third body member 40 are extended outwardly from their respective cylinder ends during this movement of the second body member 38.

After the second body member 38 is immediately adjacent the first body member 36, that is to say, the piston rods 60, 64 are retracted within the cylinders 56, 58, the foregoing process just described is repeated. The movement of the collecting device in the first direction continues for a predetermined time, normally, until the collecting device reaches a wall of the vessel 16. In order to move the collecting device in a second direction, opposite the just described first direction, a similar operation is used. Assuming that second body member 38 is immediately adjacent first body member 36 and first body member 36 is essentially adjacent the vessel wall, the clamping mechanisms of slide members 44, 48 are activated to hold first and third body members 36, 40 fixed to the track 32. Pressurized fluid is removed from the clamping mechanism of the second body member 38. Pressurized fluid is then provided through pressure drive line 79 and drive openings 80, 82 to the first and second cylinders 56, 58. The force against the piston in the two cylinders 56, 58 moves the second body member 38 along the track 32 in a second direction or towards third body member 40.

After second body member 38 is moved immediately adjacent third body member 40, the clamping mechanisms of slide members 44, 49 are disengaged by removal of the pressurized fluid applied thereto. The clamping mechanism of slide member 54 is activated by means of pressurized fluid. Subsequently, pressurized fluid is provided through pressure drive line 83 and drive openings 84, 86 of first and second cylinders 56, 58. Force of the fluid moves the piston rods 62, 66 outwardly of the cylinders 56, 58 while piston rods 60, 64 are retracted within the cylinders 56, 58.

After the piston rods 62, 66 have reached their fullest outer extent with respect to the second body member 38 or where first body member 36 is immediately adjacent second body member 38, the foregoing described process is repeated until the collecting device is moved for a predetermined time in the second direction.

The state or condition of the pressurized fluid sent to the slide members 44, 48, 54 and cylinders 56, 58 for proper working operation of the device is provided adjacent the pressure brake lines 70 and pressure drive lines 79, 83 depicted in FIG. 8. ON indicates that pressurized fluid is being applied while OFF indicates that pressurized fluid is not being applied. The first column of the first pair of columns represents the state of the pressurized fluid when the first body member 36 and the third body member 40 are being moved in the first direction (solid line arrow). The second column of the first pair of columns represents the state of the pressurized fluid when the second body member 38 is being moved in the first direction (solid line arrow).

The first column of the second pair of columns represents the state of the pressurized fluid when the third body member 40 and first body member 36 are being moved in the second direction (dotted line arrow). The second column of the second pair of columns represents the state of the pressurized fluid when the second body member 38 is being moved in the second direction (dotted line arrow).

Referring to FIGS. 9–13, different embodiments of the clamping mechanism of the present invention are provided. In FIG. 9, a cable 88 is substituted for the track 32. Unlike the slide members 44, 48, 54, slide member 90 has no opening formed at its bottom to receive a track 32. The cable is supported above the vessel floor 20 to be received within the hollow interior of the slide member 20. Pressure brake line 92 is connected to the slide member 90 and carries pressurized fluid to a bellows 94. Upon delivery of pressurized fluid, the bellows 94 expands and forces brake shoe 96 against the cable 88. The cable 88 then also engages brake shoe 98 so that slide member 90 is clamped to the cable 88. In the absence of pressurized fluid, the bellows 94 retracts and slide member 90 is no longer clamped to the cable 88 and is capable of movement therealong.

The clamping mechanism embodied in FIG. 10 includes a pair of cams 100, 102 connected to a slide member 104 for pivotal movement about pivot pins 106, 108, respectively. The cams 100, 102 are positioned on opposite sides of the bottom opening of the slide member 104. The cams 100, 102 are joined together by an interconnecting piece 110. A spring 112 attached to the interconnecting piece 110 urges the cams 100, 102 toward the track 32. A solenoid 114 having a solenoid head 116 is positioned within the slide member 104 so that the solenoid head 116 can engage the interconnecting piece 110 when the solenoid 114 is energized.

In operation, the slide member 104 is capable of movement in the direction identified by the solid line arrow of FIG. 10. However, the slide member 104 cannot move in the direction of the phantom or dotted line arrow inasmuch as the cams 100, 102 grip the track 32 when the slide member 104 is attempted to be moved in that direction. Once it is desirable to move the slide member 104 in the direction of the phantom line arrow, the solenoid 114 is energized so that the solenoid head 116 drives the interconnecting piece 110 and the cams 100, 102 pivot in a counterclockwise direction away from the track 32.

Referring to FIGS. 11–13, the clamping mechanism depicted therein is used when no track 32 is provided in the vessel 16. The clamping mechanism includes a plunger 118 having a head 120. The plunger 118 is held in a chamber 122 formed in an arm 124. An arm 124 is connected to the body members 36, 40. Pressurized fluid is delivered through a pressure brake line 126 to the appropriate chamber 122. As illustrated in FIG. 12, the plunger head 120 engages a wall 18 of the vessel 16 because of the force of the pressurized fluid acting against the plunger 118. When a vacuum is provided to a chamber 122, as illustrated in FIG. 13, the plunger head 120 retracts within the chamber 122 to permit movement of the body member to which the plunger 118 is attached.

In view of the foregoing description, a number of worthwhile objectives of the present invention are achieved. A sediment collecting device is positioned adjacent the floor of a liquid-containing vessel for gathering sediment deposited in the vessel as the device moves therealong in a stepping manner. The driving mechanism of the collecting device is surrounded by liquid except for the fluid lines which carry pressurized fluid used in moving or braking the device. The drive mechanism has no pulley or gear system. No electric motors are required within the vessel. The sediment collecting device can include a suction pipe for receiving sediment or a scraper for gathering the sediment as the collecting device moves. The device can be used in any type of vessel or basin, including circular-shaped vessels as well as rectangular-shaped vessels, and driven along any path, random or otherwise.

Although the invention has been described with reference to a plurality of embodiments, it is understood that variations and modifications can be effected within the spirit and scope of the invention.

What is claimed is:

1. A device for removing sediment adjacent a floor of a vessel containing a liquid, comprising:
   first means for removing sediment contained in the vessel;
   second means connected to said first means and positioned adjacent the floor of the vessel and substantially surrounded by the liquid for driving said first means in a stepping manner so that said first means removes the sediment adjacent the floor of the vessel as said first means is driven; and
   said stepping manner is defined by the movement of a portion of said second means relative to another portion of said second means.

2. A device, as claimed in claim 1, further including:
   third means connected to said second means for preventing movement of the said first means and said second means.

3. A device, as claimed in claim 1, wherein: said second means provides only linear motion.

4. A device, as claimed in claim 1, wherein said second means includes:
   a first body member;
   a second body member connected to said first body member;
   a third body member connected to said second body member;
   fourth means for connecting said first body member to said second body member, at least portions of said fourth means being extendable relative to said second body member in a first direction to move said first body member relative to said second body member; and
   fifth means for connecting said second body member to said third body member, at least portions of said fifth means being extendable relative to said second body member in a second direction to move said third body member relative to said second body member.

5. A device, as claimed in claim 4, wherein:
   said stepping manner is defined by the movement of said first and third body members relative to said second body member.

6. A device, as claimed in claim 4, wherein:

said stepping manner is defined by the movement of said second body member relative to said first and third body members.

7. A device, as claimed in claim 4, wherein:
at least portions of said fourth means is retractable with respect to said second body member to move said second body member relative to said first body member.

8. A device, as claimed in claim 7, wherein said fourth means includes:
cylinder means having opposing ends and connected to said second body member, said cylinder means having an opening adjacent each of said ends for receiving a pressurized fluid;
rod means connected to each of said ends of said cylinder means for reciprocating movement inwardly and outwardly of said cylinder means; and
piston means within said cylinder means and connected to each of said rod means so that, when pressurized fluid is provided to said cylinder means through at least one of said cylinder means openings, said piston means and said rod means are driven in a predetermined direction.

9. A device, as claimed in claim 2, wherein said second means includes:
a track or cable located adjacent the vessel floor along which the device moves.

10. A device, as claimed in claim 9, wherein said third means includes:
clamping means for receiving a pressurized fluid, said clamping means being held in said second means and changing in volume to clamp portions of said second means against the track or cable to prevent movement of said portions of said second means.

11. A device, as claimed in claim 10, wherein said clamping means includes;
a bar having an opening;
a diaphragm surrounding said bar and having an opening aligned with said bar opening; and
a brake pad adjacent said diaphragm which engages said track or cable to prevent movement of said portions of said second means whenever a pressurized fluid is provided to said diaphragm through said opening thereof.

12. A device, as claimed in claim 10, wherein said clamping means includes:
a bellows having an opening for receiving a pressurized fluid, upon receipt of said pressurized fluid, said bellows changing in volume for use in preventing movement of said portions of said second means.

13. A device, as claimed in claim 2, wherein said third means includes:
plunger means attached to said second means and extending therefrom, said plunger means movable in a reciprocating manner for engaging the vessel.

14. A device, as claimed in claim 9, wherein said third means includes:
a pair of cams pivotally connected to said second means, said cams positioned on opposite sides of said track or cable to permit movement of said first means in one direction but to prevent movement thereof in an opposite direction.

15. A device, as claimed in claim 2, in combination with:
a clarification basin;
fluid inlet means to said basin;
a weir adjacent the top of said basin; and
a fluid outlet means adjacent said weir.

16. A device adapted to be moved along a track or cable contained in a vessel for collecting sediment from a vessel floor, comprising:
a first body member including a slide member positioned on the track, said slide member having an opening to receive a pressure brake line for carrying pressurized fluid, said first body member further including clamping means connected to said pressure brake line;
a second body member including a slide member positioned on the track, said slide member having an opening to receive a pressure brake line for carrying pressurized fluid, said second body member further including clamping means connected to said pressure brake line;
a third body member including a slide member positioned on the track, said slide member having an opening to receive a pressure brake line for carrying pressurized fluid, said third body member further including clamping means connected to said pressure brake line;
a first cylinder having two ends and being fastened to said second body member and a second cylinder having two ends and being fastened to said second body member, each of said first and second cylinders each having a pair of openings adjacent said ends of said first and second cylinders, each of said first and second cylinder openings receiving pressure drive lines for carrying pressurized fluid, said first body member being moved relative to said second body member after pressurized fluid is provided to said second body member clamping means through said pressure brake line thereof and when pressurized fluid is provided through one of said pressure drive lines to said first and second cylinder openings located adjacent said third body member.

17. A method for moving a sediment collecting device including at least a first body member and a second body member along the floor of a vessel, comprising the steps of:
a. braking the second body member;
b. moving the first body member relative to the second body member in a direction away from the second body member;
c. braking the first body member;
d. moving the second body member relative to the first body member in a direction towards the first body member;
e. repeating steps a–d in a first direction for a predetermined time;
f. braking the first body member;
g. moving the second body member relative to the first body member in a direction away from the first body member;
h. braking the second body member;
i. moving the first body member relative to the second body member in a direction toward the second body member; and
j. repeating steps f–i in a second direction for a predetermined time.

* * * * *